United States Patent [19]

Atwood et al.

[11] Patent Number: 5,710,381
[45] Date of Patent: Jan. 20, 1998

[54] TWO PIECE HOLDER FOR PCR SAMPLE TUBES

[75] Inventors: John Girdner Atwood, West Redding; Albert Carmelo Mossa, Trumbull; Lisa May Goven, Bridgeport; Fenton Williams, Brookfield; Timothy M. Woudenberg, Bethel, all of Conn.; Marcel Margulies, Scarsdale, N.Y.; Robert P. Ragusa, Newton, Conn.; Richard Leath, Berkley; Clive Miles, San Rafael, both of Calif.

[73] Assignee: The Perkin-Elmer Corporation, Norwalk, Conn.

[21] Appl. No.: 198,079

[22] Filed: Mar. 1, 1994

Related U.S. Application Data

[60] Division of Ser. No. 871,264, Apr. 20, 1992, Pat. No. 5,475,610, which is a continuation-in-part of Ser. No. 670,545, Mar. 14, 1991, abandoned, and a continuation-in-part of Ser. No. 620,606, Nov. 29, 1990, abandoned.

[51] Int. Cl.$^6$ .................................................. B01L 9/00
[52] U.S. Cl. .................................. 73/864.91; 422/104
[58] Field of Search ........................... 73/864.91, 864.25, 73/863.11; 422/104, 65, 102; 206/589

[56] References Cited

U.S. PATENT DOCUMENTS

| | | | |
|---|---|---|---|
| Re. 34,133 | 11/1992 | Thorne | 422/99 |
| 3,311,303 | 3/1967 | Noyes . | |
| 3,392,914 | 7/1968 | Nienstadt . | |
| 3,483,997 | 12/1969 | Ritter | 211/76 |
| 3,847,200 | 11/1974 | Kopp et al. | 159/16 R |
| 3,856,471 | 12/1974 | Winitz . | |
| 3,912,913 | 10/1975 | Bunting . | |
| 3,983,363 | 9/1976 | Alter . | |
| 4,008,048 | 2/1977 | Hellemans et al. . | |
| 4,094,641 | 6/1978 | Friswell | 23/230 |

(List continued on next page.)

FOREIGN PATENT DOCUMENTS

| | | |
|---|---|---|
| 0134622 | 5/1983 | European Pat. Off. . |
| 171140 | 5/1984 | European Pat. Off. . |
| 0128778 | 12/1984 | European Pat. Off. . |

(List continued on next page.)

OTHER PUBLICATIONS

P. S. Martin, et al., J. Parent Sci. Tech.
Techne TP-16 Temperature Programmer Advertisement.
Histomat advertisement, R. Jung GmbH, Oct., 1980.

*Primary Examiner*—Robert Raevis
*Attorney, Agent, or Firm*—John R. Wahl; David Aker

[57] ABSTRACT

A two-piece plastic holder for loosely holding microliter sample tubes of a preselected design, each tube having a cylindrically shaped upper section open at its top end, a closed, tapered lower section extending downwardly therefrom, and a circumferential shoulder extending outwardly from the upper section at a position on the upper section spaced from the open end thereof. The holder includes a one-piece tray member and a one-piece retainer. The one-piece tray member including a flat, horizontal plate section containing holes in a rectangular array, a first vertical tray sidewall section around the plate extending upwardly to a height greater than the height of a tube resting in one of the holes, and a second vertical tray sidewall section around the plate extending downwardly approximately to the bottom of the upper section of a tube resting in one of the holes. The one-piece retainer is releasably engageable inside the tray over any sample tubes resting in the tray. The retainer comprises a flat, horizontal plate section containing holes in a rectangular array, and a vertical retainer sidewall section around the retainer plate section extending upwardly from the plate. When the retainer is engaged inside the tray, the retainer plate section lies slightly above the shoulder of a tube resting in the tray and the first tray sidewall section is about as high as the retainer sidewall section, so that tubes resting in the tray are retained loosely both vertically and laterally.

18 Claims, 5 Drawing Sheets

U.S. PATENT DOCUMENTS

| | | |
|---|---|---|
| 4,206,872 | 6/1980 | Levine . |
| 4,244,920 | 1/1981 | Manschot et al. ............... 422/102 |
| 4,312,835 | 1/1982 | Zoltan et al. . |
| 4,335,620 | 6/1982 | Adams . |
| 4,348,207 | 9/1982 | Cappel ............... 422/102 |
| 4,362,699 | 12/1982 | Verlander . |
| 4,401,594 | 8/1983 | Umezawa et al. ............... 260/112.5 |
| 4,404,845 | 9/1983 | Schrenker . |
| 4,474,015 | 10/1984 | Christmas et al. . |
| 4,478,094 | 10/1984 | Salomaa et al. . |
| 4,483,823 | 11/1984 | Umetsu . |
| 4,504,733 | 3/1985 | Walsh . |
| 4,517,160 | 5/1985 | Galle et al. . |
| 4,518,700 | 5/1985 | Stephens . |
| 4,544,436 | 10/1985 | Itoh et al. ............... 156/549 |
| 4,554,436 | 11/1985 | Chlosta et al. . |
| 4,554,839 | 11/1985 | Hewlett et al. . |
| 4,598,049 | 7/1986 | Zelinka . |
| 4,651,813 | 3/1987 | Witt et al. ............... 165/30 |
| 4,683,194 | 7/1987 | Saiki et al. . |
| 4,683,195 | 7/1987 | Mullis et al. . |
| 4,683,202 | 7/1987 | Mullis . |
| 4,685,081 | 8/1987 | Richman . |
| 4,693,834 | 9/1987 | Hossom ............... 210/767 |
| 4,708,886 | 11/1987 | Nelson . |
| 4,711,851 | 12/1987 | McNamara et al. . |
| 4,800,159 | 1/1989 | Mullis et al. ............... 435/172.3 |
| 4,858,155 | 8/1989 | Okawa et al. . |
| 4,865,986 | 9/1989 | Coy et al. . |
| 4,889,818 | 12/1989 | Gelfand et al. ............... 435/194 |
| 4,933,146 | 6/1990 | Meyer et al. . |
| 4,950,608 | 8/1990 | Kishimoto ............... 435/290 |
| 4,956,298 | 9/1990 | Diekmann ............... 430/311 |
| 4,965,188 | 10/1990 | Mullis et al. . |
| 4,976,780 | 12/1990 | Amano et al. ............... 304/500 |
| 4,981,801 | 1/1991 | Suzuki et al. . |
| 4,988,618 | 1/1991 | Li et al. ............... 422/104 |
| 5,008,182 | 4/1991 | Sninsky et al. ............... 435/5 |
| 5,056,427 | 10/1991 | Sakabe ............... 100/211 |
| 5,075,216 | 12/1991 | Innis et al. ............... 436/6 |
| 5,084,246 | 1/1992 | Lyman et al. ............... 422/102 |

FOREIGN PATENT DOCUMENTS

| | | |
|---|---|---|
| 0223618 | 7/1985 | European Pat. Off. . |
| 0164054 | 12/1985 | European Pat. Off. . |
| 0200362 | 12/1986 | European Pat. Off. . |
| 0238313 | 9/1987 | European Pat. Off. . |
| 0325763 | 2/1989 | European Pat. Off. . |
| 0311440 | 4/1989 | European Pat. Off. . |
| 0318255 | 5/1989 | European Pat. Off. . |
| 0388159 | 9/1990 | European Pat. Off. . |
| 413708 | 12/1977 | France . |
| 2359422 | 2/1978 | France . |
| 2490362 | 3/1982 | France . |
| 2603683 | 8/1977 | Germany . |
| 60241884 | 11/1989 | Japan . |
| 57098013 | 6/1992 | Japan . |
| 0664094 | 2/1988 | Switzerland . |
| 2161815 | 1/1986 | United Kingdom . |
| 8909437 | 10/1989 | WIPO . |
| 8912502 | 12/1989 | WIPO . |
| 9008298 | 7/1990 | WIPO . |
| 9106369 | 5/1991 | WIPO . |

TWO PIECE HOLDER FOR PCR SAMPLE TUBES

CROSS REFERENCE TO RELATED APPLICATIONS AND PATENT

This application is a division of Ser. No. 07/871,264 filed on Apr. 20, 1992, now U.S. Pat. No. 5,475,610, which is a combined continuation-in-part of both Ser. No. 07/670,545 filed on Mar. 14, 1991, abandoned and Ser. No. 07/620,606 filed on Nov. 29, 1990, abandoned.

In order to avoid the need for a lengthy specification, the teachings of U.S. Pat. No. 5,475,610 are generally incorporated herein by reference. Any reference herein to a figure number or to subject matter not directly included in this patent refers to that figure number of or to subject matter included within U.S. Pat. No. 5,475,610 and is specifically incorporated herein by reference.

BACKGROUND OF THE INVENTION

The invention pertains to the field of computer directed instruments for performing the polymerase chain reaction (hereinafter PCR). More particularly, the invention pertains to automated instruments that can perform the polymerase chain reaction simultaneously on many samples with a very high degree of precision as to results obtained for each sample. This high precision provides the capability, among other things, of performing so-called "quantitative PCR".

To amplify DNA (Deoxyribose Nucleic Acid) using the PCR process, it is necessary to cycle a specially constituted liquid reaction mixture through a PCR protocol including several different temperature incubation periods. The reaction mixture is comprised of various components such as the DNA to be amplified and at least two primers selected in a predetermined way to as to be sufficiently complementary to the sample DNA as to be able to create extension products of the DNA to be amplified. The reaction mixture includes various enzymes and/or other reagents, as well as several deoxyribonucleoside triphosphates such as dATP, dCTP, dGTP and dTTP. Generally, the primers are oligonucleotides which are capable of acting as a point of initiation of synthesis when placed under conditions in which synthesis of a primer extension product which is complimentary to a nucleic acid strand is induced, i.e., in the presence of nucleotides and inducing agents such as thermostable DNA polymerase at a suitable temperature and pH.

The Polymerase Chain Reaction (PCR) has proven a phenomenally successful technology for genetic analysis, largely because it is so simple and requires relatively low cost instrumentation. A key to PCR is the concept of thermocycling: alternating steps of melting DNA, annealing short primers to the resulting single strands, and extending those primers to make new copies of double stranded DNA. In thermocycling, the PCR reaction mixture is repeatedly cycled from high temperatures (>90° C.) for melting the DNA, to lower temperatures (40° C. to 70° C.) for primer annealing and extension. The first commercial system for performing the thermal cycling required in the polymerase chain reaction, the Perkin-Elmer Cetus DNA Thermal Cycler, was introduced in 1987.

Applications of PCR technology are now moving from basic research to applications in which large numbers of similar amplifications are routinely run. These areas include diagnostic research, biopharmaceutical development, genetic analysis, and environmental testing. Users in these areas would benefit from a high performance PCR system that would provide the user with high throughput, rapid turn-around time, and reproducible results. Users in these areas must be assured of reproducibility from sample-to-sample, run-to-run, lab-to-lab, and instrument-to-instrument.

For example, the physical mapping process in the Human Genome Project may become greatly simplified by utilizing sequence tagged sites. An STS is a short, unique sequence easily amplified by PCR and which identifies a location on the chromosome. Checking for such sites to make genome maps requires amplifying large numbers of samples in a short time with protocols which can be reproducibly run throughout the world.

As the number of PCR samples increases, it becomes more important to integrate amplification with sample preparation and post-amplification analysis. The sample vessels must not only allow rapid thermal cycling but also permit more automated handling for operations such as solvent extractions and centrifugation. The vessels should work consistently at low volumes, to reduce reagent costs.

Generally PCR temperature cycling involves at least two incubations at different temperatures. One of these incubations is for primer hybridization and a catalyzed primer extension reaction. The other incubation is for denaturation, i.e., separation of the double stranded extension products into single strand templates for use in the next hybridization and extension incubation interval. The details of the polymerase chain reaction, the temperature cycling and reaction conditions necessary for PCR as well as the various reagents and enzymes necessary to perform the reaction are described in U.S. Pat. Nos. 4,683,202, 4,683,195, EPO Publication 258,017 and U.S. Pat. No. 4,889,818 (Taq polymerase enzyme patent), which are hereby incorporated by reference.

The purpose of a polymerase chain reaction is to manufacture a large volume of DNA which is identical to an initially supplied small volume of "seed" DNA. The reaction involves copying the strands of the DNA and then using the copies to generate other copies in subsequent cycles. Under ideal conditions, each cycle will double the amount of DNA present thereby resulting in a geometric progression in the volume of copies of the "target" or "seed" DNA strands present in the reaction mixture.

A typical PCR temperature cycle requires that the reaction mixture be held accurately at each incubation temperature for a prescribed time and that that identical cycle or a similar cycle be repeated many times. A typical PCR program starts at a sample temperature of 94° C. held for 30 seconds to denature the reaction mixture. Then, the temperature of the reaction mixture is lowered to 37° C. and held for one minute to permit primer hybridization. Next, the temperature of the reaction mixture is raised to a temperature in the range from 50° C. to 72° C. where it is held for two minutes to promote the synthesis of extension products. This completes one cycle. The next PCR cycle then starts by raising the temperature of the reaction mixture to 94° C. again for strand separation of the extension products formed in the previous cycle (denaturation). Typically, the cycle is repeated 25 to 30 times.

Generally, it is desirable to change the sample temperature to the next temperature in the cycle as rapidly as possible for several reasons. First, the chemical reaction has an optimum temperature for each of its stages. Thus, less time spent at nonoptimum temperatures means a better chemical result is achieved. Another reason is that a minimum time for holding the reaction mixture at each incubation temperature is required after each said incubation temperature is reached. These minimum incubation times establish the "floor" or minimum time it takes to complete a cycle. Any time transitioning between sample incubation temperatures is time which is added to this minimum cycle time. Since the number of cycles is fairly large, this additional time unnecessarily lengthens the total time needed to complete the amplification.

In some prior automated PCR instruments, the reaction mixture was stored in a disposable plastic tube which is closed with a cap. A typical sample volume for such tubes was approximately 100 microliters. Typically, such instruments used many such tubes filled with sample DNA and reaction mixture inserted into holes called sample wells in a metal block. To perform the PCR process, the temperature of the metal block was controlled according to prescribed temperatures and times specified by the user in a PCR protocol file. A computer and associated electronics then controlled the temperature of the metal block in accordance with the user supplied data in the PCR protocol file defining the times, temperatures and number of cycles, etc. As the metal block changed temperature, the samples in the various tubes followed with similar changes in temperature. However, in these prior art instruments not all samples experienced exactly the same temperature cycle. In these prior art PCR instruments, errors in sample temperature were generated by nonuniformity of temperature from place to place within the metal sample block, i.e., temperature gradients existed within the metal of the block thereby causing some samples to have different temperatures than other samples at particular times in the cycle. Further, there were delays in transferring heat from the sample block to the sample, but the delays were not the same for all samples. To perform the PCR process successfully and efficiently, and to enable so called "quantitative" PCR, these time delays and temperature errors must be minimized to a great extent.

The problems of minimizing time delays for heat transfer to and from the sample liquid and minimizing temperature errors due to temperature gradients or nonuniformity in temperature at various points on the metal block become particularly acute when the size of the region containing samples becomes large. It is a highly desirable attribute for a PCR instrument to have a metal block which is large enough to accommodate 96 sample tubes arranged in the format of an industry standard microtiter plate.

The microtiter plate is a widely used means for handling, processing and analyzing large numbers of small samples in the biochemistry and biotechnology fields. Typically, a microtiter plate is a tray which is 3 ⅝ inches wide and 5 inches long and contains 96 identical sample wells in an 8 well by 12 well rectangular array on 9 millimeter centers. Although microtiter plates are available in a wide variety of materials, shapes and volumes of the sample wells, which are optimized for many different uses, all microtiter plates have the same overall outside dimensions and the same 8×12 array of wells on 9 millimeter centers. A wide variety of equipment is available for automating the handling, processing and analyzing of samples in this standard microtiter plate format.

Generally microtiter plates are made of injection molded or vacuum formed plastic and are inexpensive and considered disposable. Disposability is a highly desirable characteristic because of the legal liability arising out of cross contamination and the difficulty of washing and drying microtiter plates after use.

It is therefore a highly desirable characteristic for a PCR instrument to be able to perform the PCR reaction on up to 96 samples simultaneously said samples being arranged in a microtiter plate format.

Of course, the size of the metal block which is necessary to heat and cool 96 samples in an 8×12 well array on 9 millimeter centers is fairly large. This large area block creates multiple challenging engineering problems for the design of a PCR instrument which is capable of heating and cooling such a block very rapidly in a temperature range generally from 0° to 100° C. with very little tolerance for temperature variations between samples. These problems arise from several sources. First, the large thermal mass of the block makes it difficult to move the block temperature up and down in the operating range with great rapidity. Second, the need to attach the block to various external devices such as manifolds for supply and withdrawal of cooling liquid, block support attachment points, and associated other peripheral equipment creates the potential for temperature gradients to exist across the block which exceed tolerable limits.

There are also numerous other conflicts between the requirements in the design of a thermal cycling system for automated performance of the PCR reaction or other reactions requiring rapid, accurate temperature cycling of a large number of samples. For example, to change the temperature of a metal block rapidly, a large amount of heat must be added to, or removed from the sample block in a short period of time. Heat can be added from electrical resistance heaters or by flowing a heated fluid in contact with the block. Heat can be removed rapidly by flowing a chilled fluid in contact with the block. However, it is seemingly impossible to add or remove large amounts of heat rapidly in a metal block by these means without causing large differences in temperature from place to place in the block thereby forming temperature gradients which can result in nonuniformity of temperature among the samples.

Even after the process of addition or removal of heat is terminated, temperature gradients can persist for a time roughly proportional to the square of the distance that the heat stored in various points in the block must travel to cooler regions to eliminate the temperature gradient. Thus, as a metal block is made larger to accommodate more samples, the time it takes for temperature gradients existing in the block to decay after a temperature change causes temperature gradients which extend across the largest dimensions of the block can become markedly longer. This makes it increasingly difficult to cycle the temperature of the sample block rapidly while maintaining accurate temperature uniformity among all the samples.

Because of the time required for temperature gradients to dissipate, an important need has arisen in the design of a high performance PCR instrument to prevent the creation of temperature gradients that extend over large distances in the block. Another need is to avoid, as much as possible, the requirement for heat to travel across mechanical boundaries between metal parts or other peripheral equipment attached to the block. It is difficult to join metal parts in a way that insures uniformly high thermal conductance everywhere across the joint. Nonuniformities of thermal conductance will generate unwanted temperature gradients.

SUMMARY OF THE INVENTION

According to the teachings of the invention, there is disclosed herein a thin walled sample tube for decreasing the delay between changes in sample temperature of the sample block and corresponding changes in temperature of the reaction mixture. Two different sample tube sizes are disclosed, but each has a thin walled conical section that fits into a matching conical recess in the sample block.

Typically, cones with 17° angles relative to the longitudinal axis are used to prevent jamming of the tubes into the sample block but to allow snug fit. Other shapes and angles would also suffice for purposes of practicing the invention.

Also, other types of heat exchangers can also be used other than sample blocks such as liquid baths, ovens, etc. However, the wall thickness of the section of the sample tube which is in contact with whatever heat exchange is being used should be as thin as possible so long as it is sufficiently strong to withstand the thermal stresses of PCR cycling and the stresses of normal use. Typically, the sample tubes are made of autoclavable polypropylene such as Himont PD701 with a wall thickness of the conical section in the range from 0.009 to 0.012 inches plus or minus 0.001 inches. Most preferably, the wall thickness is 0.012 inches for larger tubes as shown in FIG. 50.

In the preferred embodiment, the sample tube also has a thicker walled cylindrical section which joins with the conical section. This cylindrical section provides containment for the original reaction mixture or reagents which may be added after PCR processing.

The sample tube shown in FIG. 50 has industry standard configuration except for the thin walls for compatibility in other PCR systems. The sample tube of FIG. 15 is a shorter tube which can be used with the system disclosed herein. The other subject matter of the system environment in which use of the thin walled sample tubes is preferred are summarized below.

There is also described herein a novel method and apparatus for achieving very accurate temperature control for a very large number of samples arranged in the microtiter plate format during the performance of very rapid temperature cycling PCR protocols. The teachings of the invention contemplate a novel structure for a sample block, sample tubes and supporting mounting, heating and cooling apparatus, control electronics and software, a novel user interface and a novel method of using said apparatus to perform the PCR protocol.

The instrument described herein is designed to do PCR gene amplification on up to 96 samples with very tight tolerances of temperature control across the universe of samples. This means that all samples go up and down in temperature simultaneously with very little difference in temperature between different wells containing different samples, this being true throughout the polymerase chain reaction cycle. The instrument described herein is also capable of very tight control of the reaction mixture concentration through control of the evaporation and condensation processes in each sample well. Further, the instrument described herein is capable of processing up to 96 samples of 100 microliters each from different donor sources with substantially no cross-contamination between sample wells.

The teachings of the invention herein include a novel method of heating and cooling an aluminum sample block to thermally cycle samples in the standard 96-well microtiter plate format with the result that excellent sample-to-sample uniformity exists despite rapid thermal cycling rates, non-controlled varying ambient temperatures and variations in other operating conditions such as power line voltage and coolant temperatures.

The teachings of the invention also contemplate a novel design for a disposable plastic 96-well microtiter plate for accommodation of up to 96 individual sample tubes containing DNA for thermal cycling each sample tube having individual freedom of movement sufficient to find the best fit with the sample block under downward pressure from a heated cover. The microtiter plate design, by allowing each tube to find the best fit, provides high and uniform thermal conductance from the sample block to each sample tube even if differing rates of thermal expansion and contraction between the metal of the block and the plastic of the sample tube and microtiter plate structure cause the relative center-to-center dimensions of the wells in the sample block to change relative to the center-to-center distance of the sample tubes in the disposable microtiter plate structure.

The teachings of the invention also contemplate a novel method and apparatus for controlling the PCR instrument which includes the ability to continuously calculate and display the temperature of the samples being processed without directly measuring these temperatures. These calculated temperatures are used to control the time that the samples are held within the given temperature tolerance band for each target temperature of incubation. The control system also controls a three-zone heater thermally coupled to the sample block and gates fluid flow through directionally interlaced ramp cooling channels in the sample block which, when combined with a constant bias cooling flow of coolant through the sample block provides a facility to achieve rapid temperature changes to and precise temperature control at target temperatures specified by the user. The method and apparatus for controlling the three-zone heater includes an apparatus for taking into account, among other things, the line voltage, block temperature, coolant temperature and ambient temperature in calculating the amount of electrical energy to be supplied to the various zones of the three-zone heater. This heater has zones which are separately controllable under the edges or "guard bands" of the sample block so that excess heat losses to the ambient through peripheral equipment attached to the edges of the sample block can be compensated. This helps prevent thermal gradients from forming.

The teachings of the invention also contemplate a novel method and apparatus for preventing loss of solvent from the reaction mixtures when the samples are being incubated at temperatures near their boiling point. A heated platen covers the tops of the sample tubes and is in contact with an individual cap which provides a gas-tight seal for each sample tube. The heat from the platen heats the upper parts of each sample tube and the cap to a temperature above the condensation point such that no condensation and refluxing occurs within any sample tube. Condensation represents a relatively large heat transfer since an amount of heat equal to the heat of vaporization is given up when water vapor condenses. This could cause large temperature variations from sample to sample if the condensation does not occur uniformly. The heated platen prevents any condensation from occurring in any sample tube thereby minimizing this source of potential temperature errors. The use of the heated platen also reduces reagent consumption.

Furthermore, the heated platen provides a downward force for each sample tube which exceeds an experimentally determined minimum downward force necessary to keep all sample tubes pressed firmly into the temperature controlled sample block so as to establish and maintain uniform block-to-tube thermal conductance for each tube. This uniformity of thermal conductance is established regardless of variations from tube to tube in length, diameter, angle or other dimensional errors which otherwise could cause some sample tubes to fit more snugly in their corresponding sample wells than other sample tubes.

The heated platen softens the plastic of each cap but does not totally destroy the cap's elasticity. Thus, a minimum threshold downward forced is successfully applied to each tube despite differences in tube height from tube to tube.

The PCR instrument described herein reduces cycle times by a factor of 2 or more and lowers reagent cost by accommodating PCR volumes down to 20 ul but remains compatible with the industry standard 0.5 ml microcentrifuge tube.

DETAILED DESCRIPTION OF THE PREFERRED EMBODIMENT

According to the teachings of the preferred embodiment of the invention, all the above noted requirements have been met by using a 4 piece disposable plastic system. This system gives each sample tube sufficient freedom of motion in all necessary directions to compensate for differing rates of thermal expansion and yet retains up to 96 sample tubes in a 96 well microtiter plate format for user convenience and compatibility with other laboratory equipment which is sized to work with the industry standard 96-well microtiter plate. The multi-piece disposable plastic system is very tolerant of manufacturing tolerance errors and the differing thermal expansion rates over the wide temperature range encountered during PCR thermal cycling.

Figure 1A:
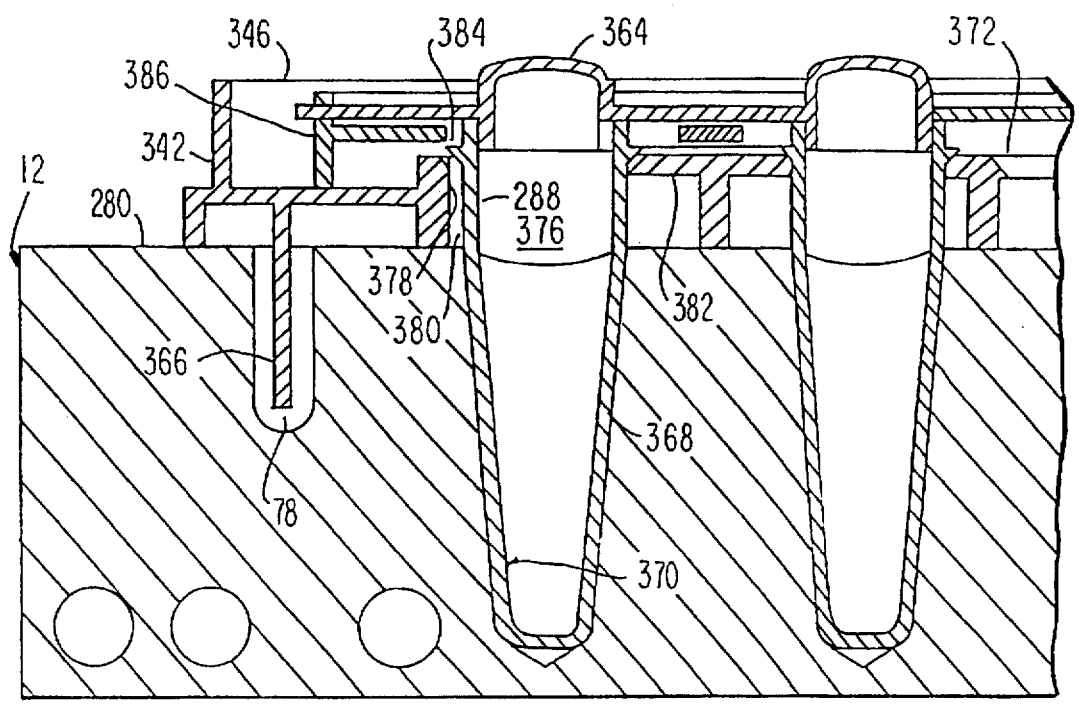
FIG. 1A is a cross-sectional view of the assembly of one embodiment of the frame, retainer, sample tube and cap when seated on a sample block.
Figure 1B:
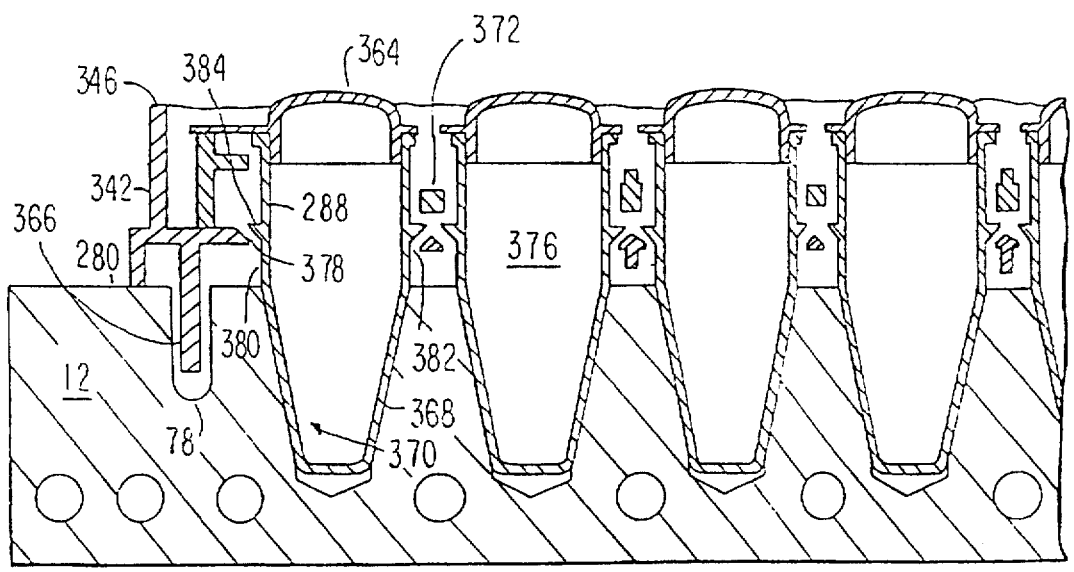
FIG. 1B is a cross-sectional view of the assembly of the preferred embodiment of the frame, retainer, sample tube and cap when seated on the sample block.
Figure 2:
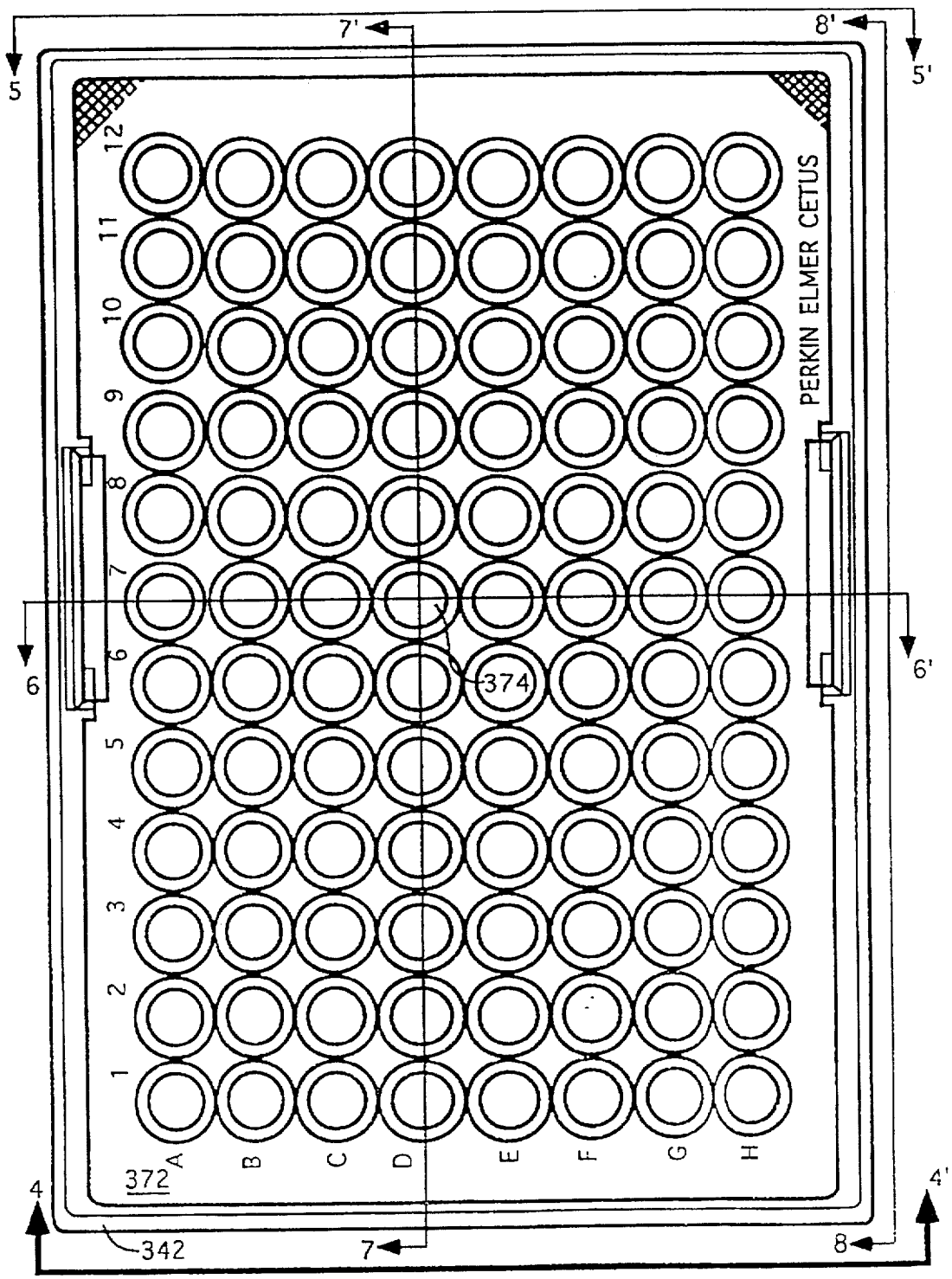
FIG. 2 is a top, plan view of the plastic, disposable frame for the microtiter plate.
Figure 3:
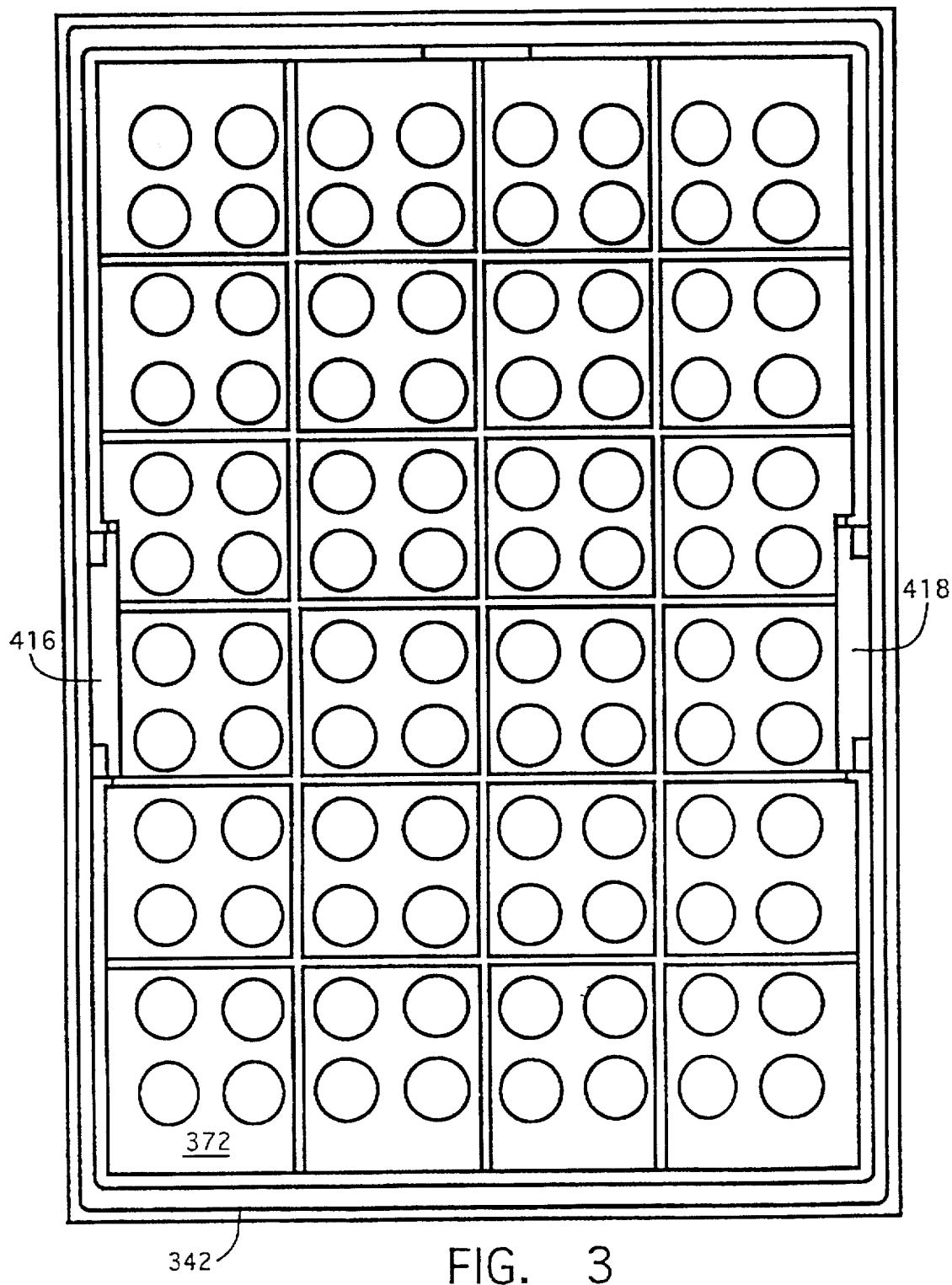
FIG. 3 is a bottom, plan view of the frame.
Figure 4:
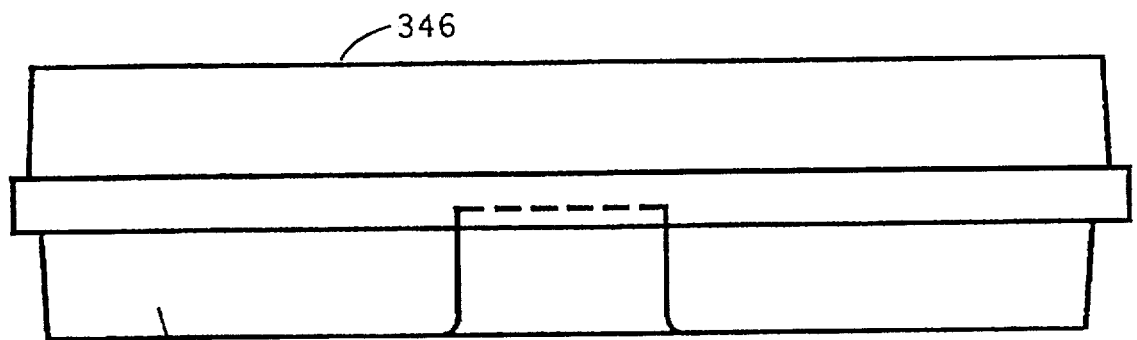
FIG. 4 is an end, elevation view of the frame.
Figure 5:
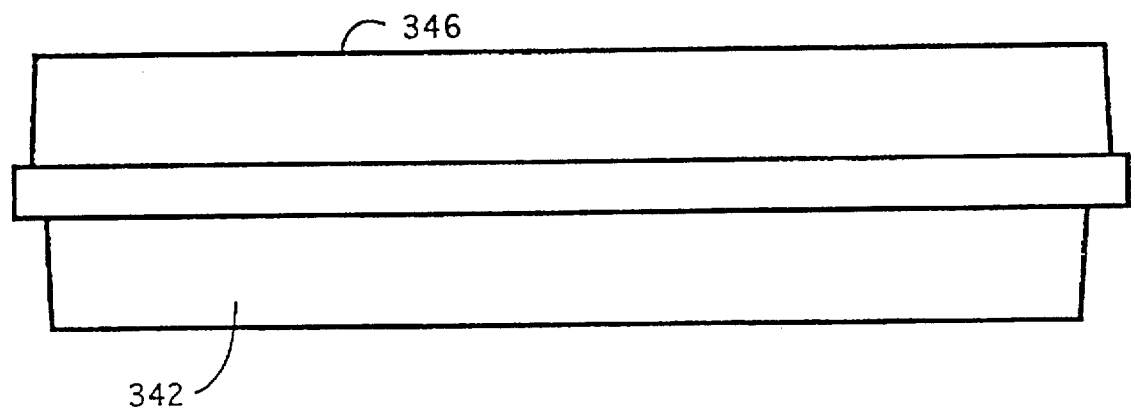
FIG. 5 is another end, elevation view of the frame.
Figure 6:
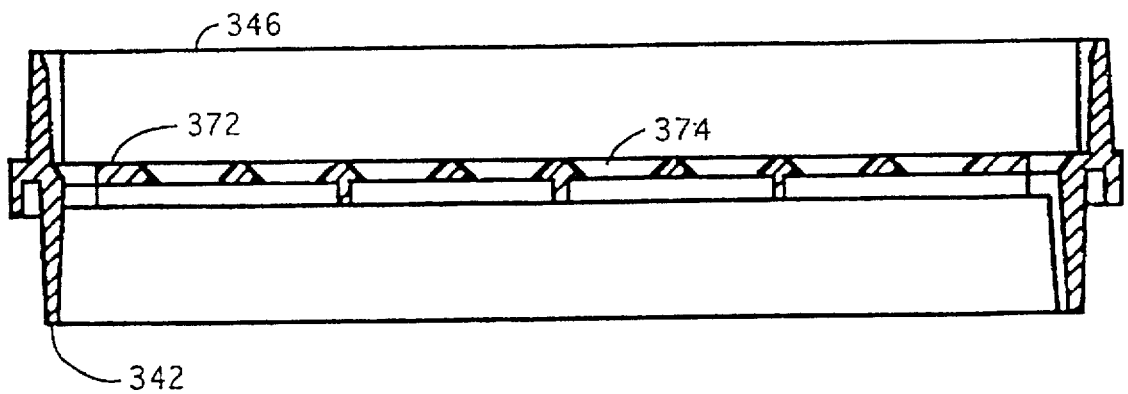
FIG. 6 is a cross-sectional view of the frame taken along section line 6–6' in FIG. 2.
Figure 7:
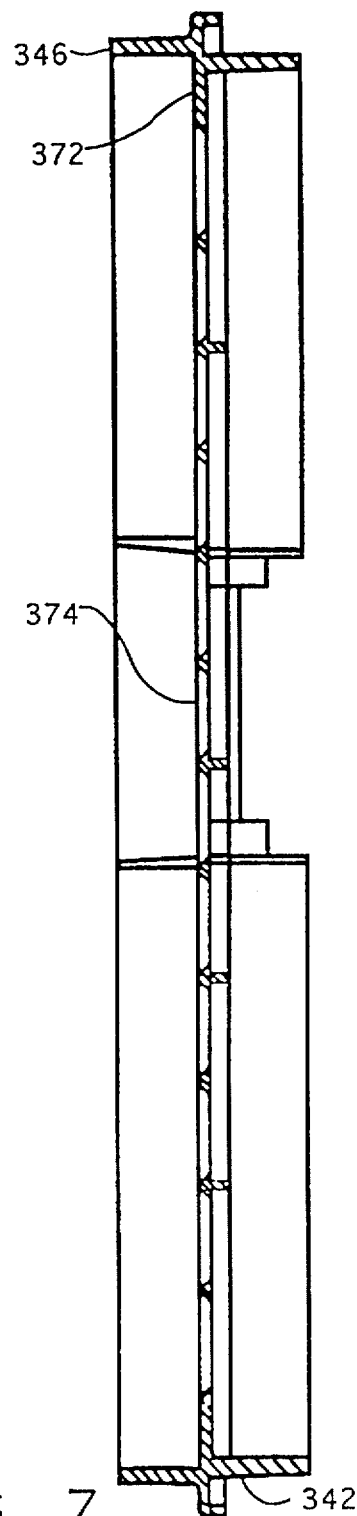
FIG. 7 is a cross-sectional view of the frame taken along section line 7–7' in FIG. 2.
Figure 8:
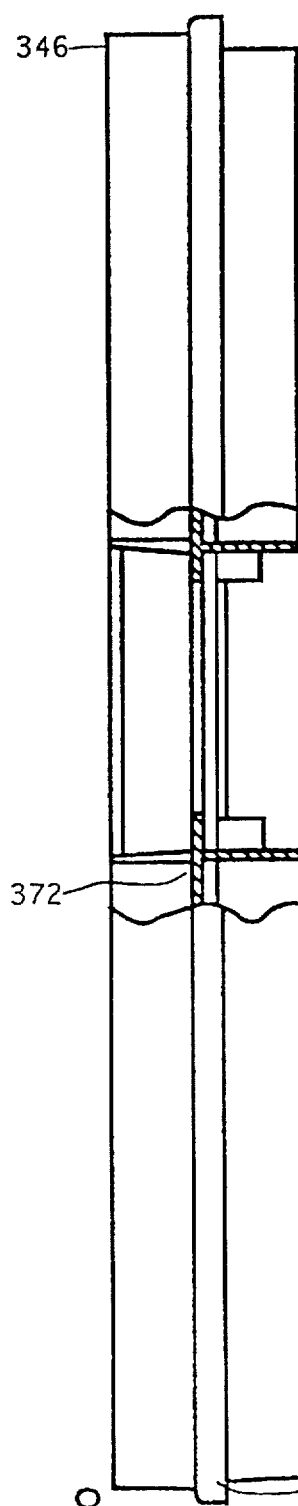
FIG. 8 is an edge elevation view and partial section of the frame.

FIGS. 1A and 1B show alternative embodiments of most of the four piece plastic system components in cross-section as assembled to hold a plurality of sample tubes in their sample wells with sufficient freedom of motion to account for differing rates of thermal expansion. FIG. 45 of U.S. Pat. No. 5,475,610 shows all the parts of the disposable plastic microtiter plate emulation system in an exploded view. This figure illustrates how the parts fit together to form a microtiter plate with all the sample tubes loosely retained in an 8×12 microtiter plate format 96 well array. FIG. 2 shows a plan view of a microtiter plate frame 342 according to the teachings of the invention which is partially shown in cross-section in FIGS. 1A and 1B. FIG. 3 shows a bottom view plan view of the frame 342. FIG. 4 is an end view of the frame 342 taken from view line 4–4' in FIG. 2. FIG. 5 is an end view of the frame 342 taken from view line 5–5' in FIG. 2. FIG. 6 is a cross section through the frame 342 at section line 6–6' in FIG. 2. FIG. 7 is a cross sectional view through the frame 342 taken along section line 7–7' in FIG. 2. FIG. 8 is a side view of the frame 342 taken along view line 8–8' in FIG. 2 with a partial cut away to show in more detail the location where a retainer to be described below clips to the frame 342.

Referring jointly to FIGS. 1A, 1B and 2 through 8, the frame 342 is comprised of a horizontal plastic plate 372 in which there are formed 96 holes spaced on 9 millimeter centers in the standard microtiter plate format. There are 8 rows labeled A through H and 12 columns labeled 1 through 12. Hole 374 at row D, column 7 is typical of these holes. In each hole in the frame 342 there is placed a conical sample tube such as the sample tube 376 shown in FIG. 15. Each sample tube is smaller in diameter than the hole in which it is placed by about 0.7 millimeters, so that there is a loose fit in the hole. This is best seen in FIGS. 1A and 1B by observing the distance between the inside edge 378 of a typical hole and the side wall 380 of the sample tube placed therein. Reference numeral 382 in FIGS. 1A and 1B shows the opposite edge of the hole which is also spaced away from the outside wall of the cylindrical portion of the sample tube 376.

Each sample tube has a shoulder shown at 384 in FIGS. 15 of U.S. Pat. No. 5,475,610, 1A and 1B. This shoulder is molded around the entire circumference of the cylindrical portion 288 of each sample tube. As is shown in a preferred embodiment of FIGS. 1A, 1B and 6, the lower surface of shoulder 384 is beveled and the hole 374 is countersunk. This aids in centering the tube upright in hole 374 in frame 342. The diameter of this shoulder 384 is large enough that it will not pass through the holes in the frame 342, yet not so large as to touch the shoulders of the adjacent tubes in neighboring holes.

Once all the tubes are placed in their holes in the frame 342, a plastic retainer 386 (best seen in FIGS. 1A and 1B and FIG. 45) of U.S. Pat. No. 5,475,610 is snapped into apertures in the frame 342. The purpose of this retainer is to keep all the tubes in place such that they cannot fall out or be knocked out of the frame 342 while not interfering with their looseness of fit in the frame 342. The retainer 386 is sized and fitted to the frame 342 such that each sample tube has freedom to move vertically up and down to some extent before the shoulder 384 of the tube encounters either the retainer 386 or the frame 342. Thus, the frame and retainer, when coupled, provide a microtiter plate format for up to 96 sample tubes but provide sufficient horizontal and vertical freedom such that each tube is free to find its best fit at all temperatures under the influence of the minimum threshold force F in FIG. 15 of U.S. Pat. No. 5,475,610. As shown in the embodiment depicted in FIG. 15, shoulder 384 may be located approximately in the midsection of cylindrical portion 288 of tube 376.

A more clear view of the sample tube and shoulder may be had by reference to FIGS. 29 and 30 of U.S. Pat. No. 5,475,610. FIGS. 29 and 30 are an elevation sectional view and a partial upper section of the shoulder portion, respectively, of a typical sample tube. A plastic dome-shaped cap such as will be described in more detail below is inserted into the sample tube shown in FIG. 29 and forms a hermetic seal with the inside wall 390 of the top at the sample tube. A ridge 392 formed in the inside wall of the sample tube acts as a stop for the dome-shaped cap to prevent further penetration. Normally, the dome-shaped caps come in strips connected by web.

What we claim is:

1. A two-piece plastic holder for loosely holding a plurality of microliter sample tubes of a preselected design, each having a cylindrically shaped upper section open at its top end and a closed, tapered lower section extending downwardly therefrom, each tube being of circular cross section and having a circumferential shoulder extending outwardly from said upper section at a position on said upper section spaced from the open end thereof, comprising a. a one-piece tray member comprising i. a flat, horizontal plate section containing holes in a rectangular array compatible with industry standard microliter plate format, said holes being slightly larger than the outside diameter of the upper sections of said tubes but smaller than the outside diameter of said shoulder, ii. a first vertical tray sidewall section completely around said plate extending upwardly to a height greater than the height of a tube resting in one of said holes, iii. a second vertical tray sidewall section around said plate extending downwardly approximately to the bottom of the upper section of a tube resting in one of said holes, b. a one-piece retainer releasably engageable inside said tray over any sample tubes resting in said tray comprising i. a flat, horizontal plate section containing holes in a rectangular array compatible with industry standard microliter plate format, said holes being slightly larger than the outside diameter of the upper sections of said tubes but smaller than the outside diameter of said shoulder, ii. a vertical retainer sidewall section around said retainer plate section extending upwardly from said plate, wherein when said retainer is engaged inside said tray, the retainer plate section lies slightly above the shoulder of a tube resting in said tray and the first tray sidewall section is about as high as said retainer sidewall section, whereby tubes resting in said tray are retained loosely both vertically and laterally.

2. Apparatus according to claim 1 wherein the holes in said tray member are countersunk and wherein the underside of the shoulders of said tubes are correspondingly beveled.

3. Apparatus according to claim 2 wherein the holes in the tray plate section and in the retainer plate section are larger in diameter than said tubes by about 0.7 mm.

4. Apparatus according to claim 1 wherein said tray member further comprises a plurality of support ribs extending along the underside of the tray plate member between rows of holes, said ribs extending downwardly to the same extent as said second vertical tray sidewall section.

5. Apparatus according to claim 1 wherein said tray member further comprises a skirt section extending at least partially around said tray plate section and depending vertically from that section, said skirt section being adapted to fit into a guard band groove in a thermocycler sample block.

6. Apparatus according to claim 1 wherein said tray plate section has at least two openings provided therein and said retainer plate section has an identical number of vertical tabs, downwardly extending from said retainer plate, such that said tabs project through said openings and releasably engage the tray when said retainer is assembled with said tray.

7. Apparatus according to claim 6 wherein said tabs are disposed so as to form part of a skirt section extending downwardly at least partially around said tray plate section and wherein said tabs are adapted to fit into a guard band groove in a thermocycler sample block.

8. Apparatus according to claim 7 wherein said openings and said tabs are positioned such that said retainer and said tray are capable of only one orientation relative to one another when said openings and said tabs are engaged.

9. Apparatus according to claim 6 wherein said tabs are deflectable in a sidewise direction in order to come into alignment with said openings.

10. Apparatus according to claim 1 further comprising up to 96 microliter sample tubes in said holder.

11. Apparatus according to claim 10 further comprising up to 96 deformable caps on said tubes for forming gas-tight seals thereon.

12. Apparatus according to claim 11 wherein each said cap has a downwardly depending cylindrical flange for forming a gas-tight seal with each said tube and a circumferential shoulder extending outwardly from said flange which prevents said flange from being seated on said tube below a predetermined point.

13. Apparatus according to claim 12 wherein the outer circumference of said downwardly depending flange fits snugly to form a gas-tight seal with the inner circumference of said tube.

14. Apparatus according to claim 11 wherein groups of 12 of said caps are linked together to form a single strand of caps which are suitably spaced so as to form gas-tight seals with up to 12 of said tubes.

15. Apparatus according to claim 1 further comprising a plastic base having 96 wells arranged in an 8-by-12 rectangular array, said wells being dimensioned to snugly accept the lower sections of up to 96 said sample tubes, said base being assemblable with said tray, said retainer and 96 of said tubes to form a microliter plate having the footprint of an industry standard microliter plate.

16. Apparatus according to claim 11 wherein said caps project above said first vertical tray sidewall section but are downwardly deformable to the height of said section.

17. Apparatus according to claim 16 wherein said caps are deformable by heat and vertically downward force.

18. Apparatus according to claim 16 wherein said caps are resiliently deformable.

* * * * *